(12) United States Patent
McLaughlin

(10) Patent No.: US 6,260,888 B1
(45) Date of Patent: Jul. 17, 2001

(54) MANIFOLD ATTACHMENT

(75) Inventor: James Patrick McLaughlin, Grosse Ile, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 09/149,249

(22) Filed: Sep. 8, 1998

(51) Int. Cl.[7] ..................................................... F16L 27/04
(52) U.S. Cl. ........................ 285/261; 285/185; 181/240
(58) Field of Search .................................... 285/262, 191, 285/185, 261, 272.1; 181/240

(56) References Cited

U.S. PATENT DOCUMENTS

| | | | |
|---|---|---|---|
| 489,064 | * 1/1893 | Winkelmann | 285/185 |
| 551,575 | * 12/1895 | Bookwalter | 285/185 |
| 791,093 | * 5/1905 | Gulland | 285/262 |
| 1,634,000 | * 6/1927 | Smith . | |
| 2,150,583 | * 3/1939 | Long | 285/185 |
| 2,321,417 | * 6/1943 | Pepersack . | |
| 2,554,514 | * 5/1951 | Wright et al. | 285/185 |
| 3,761,115 | * 9/1973 | Papasian | 285/185 |
| 3,897,854 | * 8/1975 | Rhodes . | |
| 4,097,071 | 6/1978 | Crawford et al. . | |
| 4,161,331 | 7/1979 | Hansen . | |
| 4,277,092 | 7/1981 | Viers . | |
| 4,858,722 | * 8/1989 | Abbe et al. . | |
| 5,040,805 | 8/1991 | Ozora . | |
| 5,348,414 | 9/1994 | Dziuk et al. . | |
| 5,463,194 | 10/1995 | Ransom et al. . | |
| 5,611,409 | * 3/1997 | Arseneau . | |
| 5,683,119 | 11/1997 | Emmons et al. . | |
| 5,697,650 | 12/1997 | Brown . | |

* cited by examiner

*Primary Examiner*—Teri Pham Luu
(74) *Attorney, Agent, or Firm*—Ford Global Technologies

(57) ABSTRACT

An exhaust system includes a manifold having an exhaust port. An exhaust pipe is sealingly engaged with the exhaust port. A hole is provided in the exhaust pipe and a fastener traverses the hole to secure the exhaust pipe to the manifold.

18 Claims, 3 Drawing Sheets

MANIFOLD ATTACHMENT

FIELD OF THE INVENTION

The invention relates to a manifold attachment, and more particularly such an attachment for the exhaust manifold for an internal combustion engine.

BACKGROUND OF THE INVENTION

Vehicle exhaust, and more particularly exhaust pipe to exhaust manifold attachments, are difficult to assemble and operate reliably due to the harsh environment and confined space in which they operate.

An example of such an attachment is described in U.S. Pat. No. 5,463,194, assigned to the assignee of the present invention, and which is incorporated herein by reference in its entirety. As shown in the Figure of the '194 patent, a pair of diametrically spaced bolts 20 connect a flange 16 to an exhaust manifold 10. This attachment provides a clamping force which is unequally distributed about the periphery of the joint, since the bolts provide a maximum clamping force at two discrete diametrically opposed positions.

It would therefore be desirable to provide an exhaust manifold attachment which provides constant clamping force about the circumference of the attachment.

SUMMARY OF THE INVENTION

An object of the invention claimed herein is to provide an exhaust manifold attachment which provides a constant clamping force about the periphery of the attachment.

The above object is achieved, and problems of prior approaches overcome, by an exhaust system including a manifold having an exhaust port. An exhaust pipe is sealingly engaged with the exhaust port. A hole is provided in the exhaust pipe and a fastener traverses the hole to secure the exhaust pipe to the manifold.

An advantage of the present invention is that it reduces the number of bolts used for each attachment to a single bolt, thereby reducing cost and complexity while increasing available packaging space.

Another advantage of the present invention is an improvement in the ability to accommodate misalignment of the exhaust and providing a manner of accommodating movement during operation of the motor vehicle.

Other objects, features and advantages of the present invention will be readily appreciated by the reader of this specification.

BRIEF DESCRIPTION OF THE DRAWINGS

The invention will now be described, by way of example, with reference to the accompanying drawing, in which.

DESCRIPTION OF THE PREFERRED EMBODIMENTS

Figure 1:
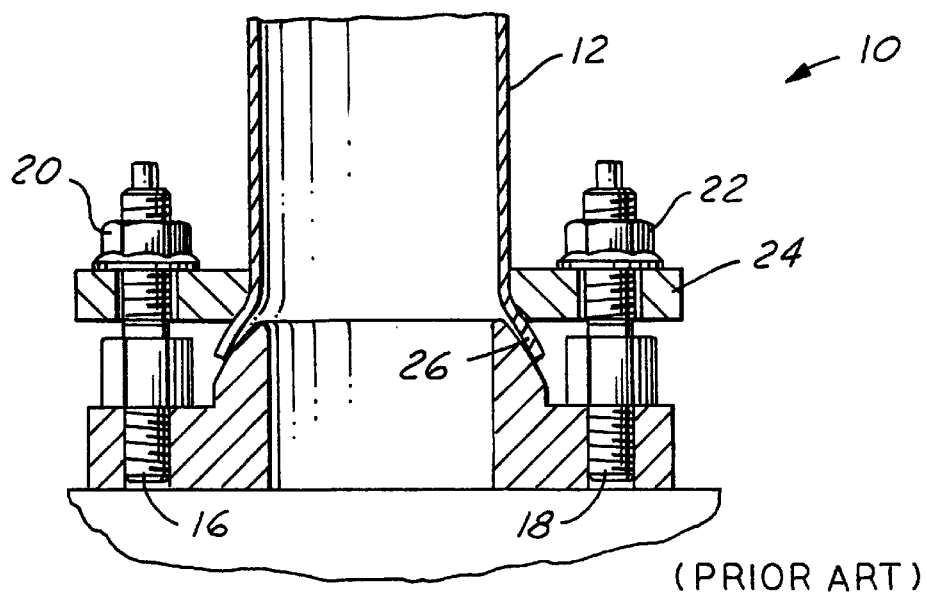
FIG. 1 is a schematic cross sectional view of a Prior Art attachment.

As shown in FIG. 1, a prior art exhaust manifold assembly 10, as described above, has an exhaust pipe 12 attached to a manifold 14 using a pair of diametrically spaced fasteners, illustrated as a pair of studs 16, 18 and nuts 20, 22. A flange 24 is provided about the pipe 12, which engages a flared end 26 of the pipe 12, forcing the flared end 26 into sealing engagement with the manifold 14.

Figure 2:
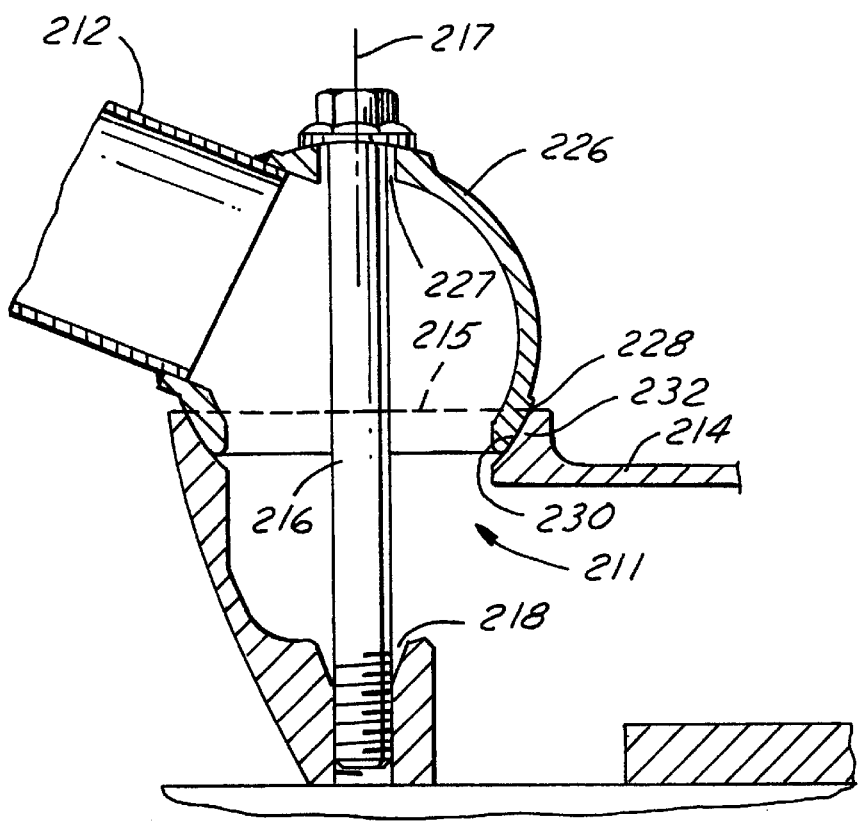
FIG. 2 is a schematic cross sectional view of an attachment according to the present invention.

As shown in FIG. 2, the present invention uses a single threaded attachment for securing an exhaust pipe 212 to an exhaust manifold 214. The illustrated threaded attachment comprises a bolt 216 having an axis 217, the bolt 216 threadably engaged with a threaded hole 218 provided in the manifold 214. As shown in FIG. 2, a cast spherical flange 226 is provided. The spherical flange 226 includes a first end 228 having a spherical surface 230 for engagement with a mating spherical surface 232 on the manifold 214. The bolt 216 is installed through a hole 227 provided in the spherical flange 226 to threadably engage the manifold 214 as described above. In one embodiment, the spherical surfaces 230, 232 are machined to obtain maximum sealing engagement. In an alternative embodiment, a seal (not shown in FIG. 2) is provided between the spherical surfaces 230, 232 as known to one skilled in the art. One example of such a seal is described in the U.S. Pat. No. 5,463,194 (illustrated as 14 in the Figure of the '194 patent). Although not illustrated, one skilled in the art readily appreciates the bolt 216 could comprise a stud secured to the manifold and a nut attached thereto after the spherical flange 226 is positioned over such a stud.

The manifold 214 has a port 211 for the passage of exhaust gas in a known manner. The port 211 in the illustrated embodiments is substantially circular, but one skilled in the art appreciates various other shapes are useful. As illustrated in FIG. 2, the bolt 216 passes through a plane 215 at the interface between the flange 226 and manifold 214, substantially central the exhaust port 211. By securing the flange 226 substantially central the port 211, the clamp load is substantially evenly distributed about the periphery of the entire sealing surfaces 230, 232.

The pipe 212 is preferably welded to the spherical flange 226 as is known to one skilled in the art, so the exhaust port 311 in the manifold may communicate through the spherical flange 226 to the pipe 212 without leaks. The hole 227 and fastener 216 are preferably positioned so the bolt 216 engages the spherical flange 226 substantially central with respect to the spherical surfaces 230, 232 so as to substantially evenly distribute the clamp load provided thereby about the periphery of the spherical surfaces when the bolt 216 is secured to the manifold 214. Furthermore, there is preferably adequate clearance between the bolt 216 and the hole 227 so as to permit rotation of the spherical flange 226 with respect to the spherical surface of the manifold 214, thereby accommodating any misalignment of the pipe 212 to the manifold 214 or accommodate movement therebetween during assembly or operation of the vehicle. In an alternative embodiment, a gasket (not shown in FIG. 2) is provided between the head of the bolt 216 and the spherical flange 226 to fully seal therebetween.

Figure 3:
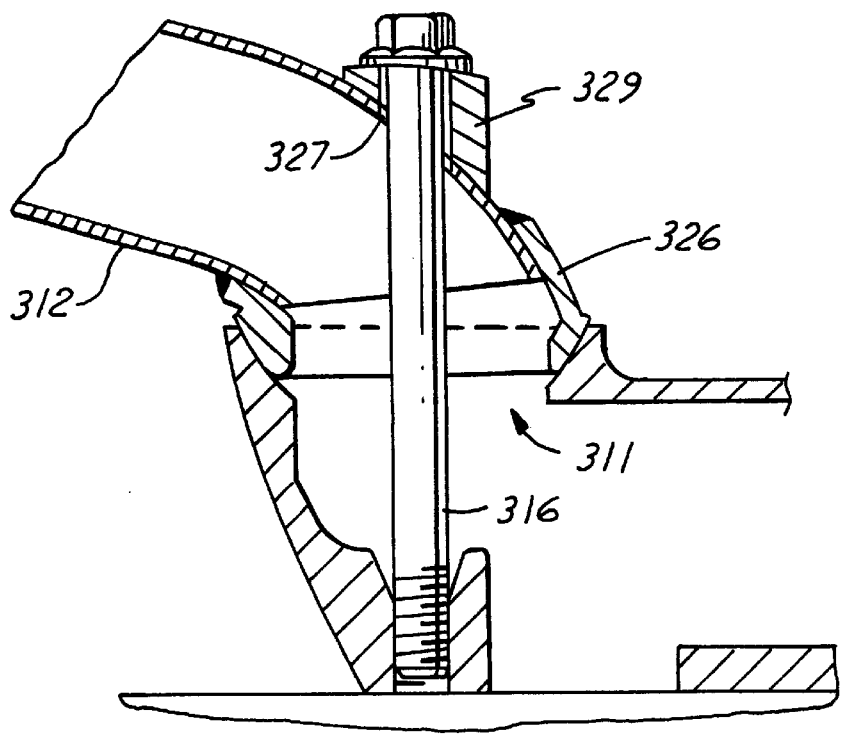
FIG. 3 is a schematic cross sectional view of an alternative embodiment according to the present invention.

As shown in FIG. 3, an alternative embodiment comprises a bend 325 in the pipe 312 and a hole 327 provided therethrough. A spherical flange 326 is preferably secured to the pipe 312 for attachment to the manifold. This construction simplifies the manufacture of the spherical flange 326. In FIG. 3, a washer 329 is provided to bear against the pipe 312, thereby providing a flat clamp surface and more evenly distributing the load about the hole 327 in the pipe 312. The washer 329 may also be constructed to seal between the bolt 316 and pipe 312.

Figure 4:
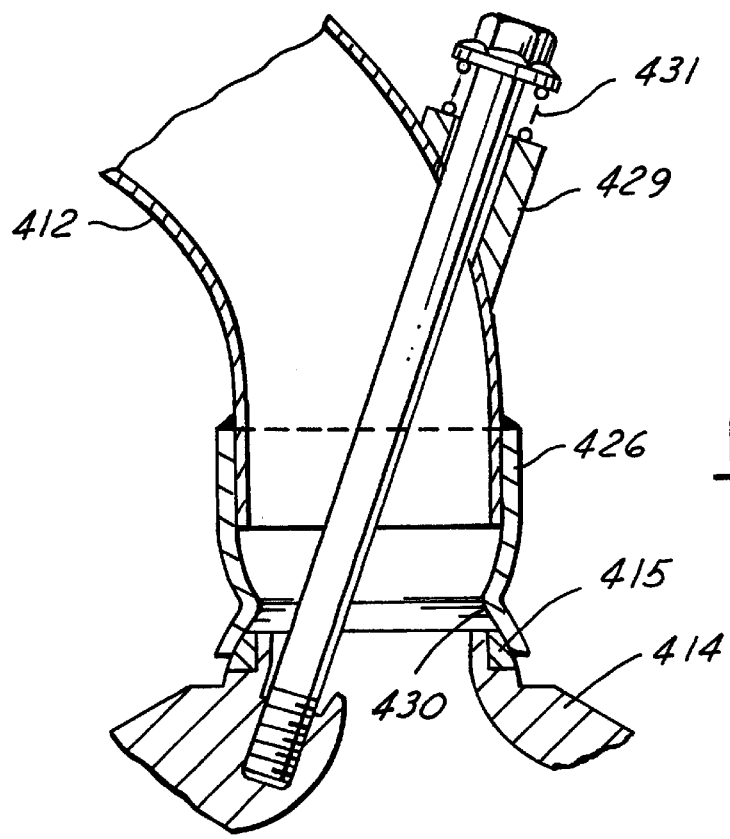
FIG. 4 is a schematic cross sectional view of a further alternative embodiment according to the present invention.

As illustrated in FIG. 4, a further alternative embodiment is shown, where the pipe 412 is welded to a spherical flange 426 for sealing engagement with the manifold 414. Preferably a collar 415 is provided in this embodiment, in a manner similar to the collar of the '194 patent. In this embodiment, the bolt 416 sealingly engages spherical flange 426 to the manifold 414 using a resilient connection 431. This embodiment thereby more readily accommodates relative movement during vehicle operation. A washer 429 is provided between the spring 431 and pipe 312 to distribute the load over the pipe, provide a flat clamp surface and seal therebetween. One skilled in the art could modify the embodiment of FIG. 2 to manufacture the spherical flange 226 in a similar manner. As shown in FIG. 4, the spherical surface 430 may be internal to the spherical flange 426. Likewise, a collar similar to 415 could be provided in the other embodiments.

Figure 5:
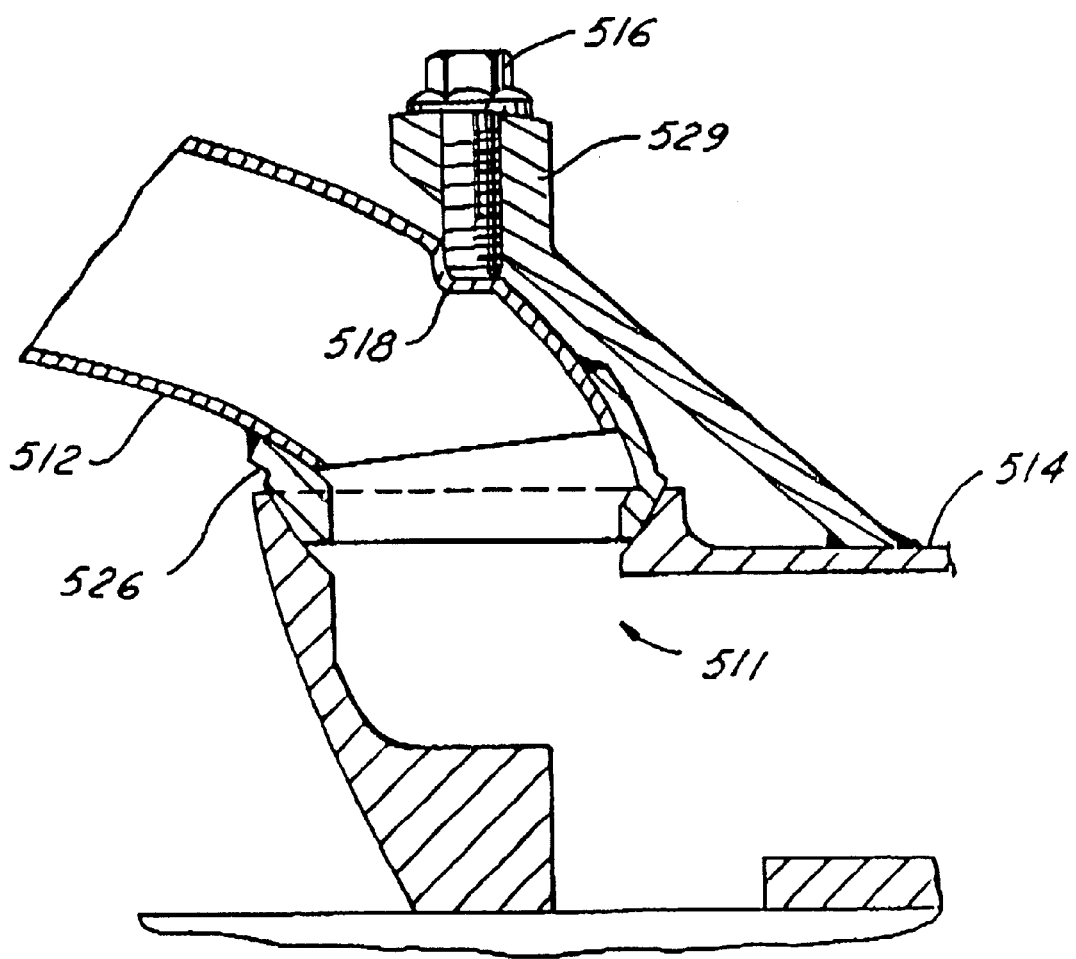
FIG. 5 is a schematic cross sectional view of a further alternative embodiment according to the present invention.

FIG. 5 provides a further alternative to the present invention. As shown in FIG. 5, a depression 518 is provided in an exhaust pipe 512 for receiving a bolt 516. The depression provides a substantially flat clamping surface for the bolt 516 and may locate the pipe 512 with respect to the bracket 529 by being below flush to the surface of the pipe 512. The bolt 516 is threadably engaged with a bracket 529 attached to the exhaust manifold 514 and thus the bolt is secured to the manifold 514 through the bracket 529. In the illustrative embodiment provided in FIG. 5, the bracket 529 is welded to the manifold 514, but in an alternative embodiment a bracket is integrally formed (not shown) in the manifold 514, or alternatively an arc-shaped bracket (not shown) spans the exhaust pipe 512 and is attached at both ends to the manifold 514 (for example, slidably engaged into flanges (not shown) formed on the manifold 514). In each of these embodiments, the bracket 516 serves to position the bolt 516 above the exhaust pipe 512 so the bolt 516 clamps the pipe 512 to the manifold 514. In this manner, a single bolt 516 applies clamping pressure to the assembly substantially central the opening 511 to evenly distribute the clamp force about the periphery of the joint between the pipe 512 and manifold 514. In the illustrated embodiment, a flange 526 is provided, but one skilled in the art appreciates that a joint as illustrated in FIG. 1 could be modified to centrally locate a single bolt to the joint to clamp the assembly as described above. The depression 518 is shown in the pipe 512, but in an alternative embodiment (not shown) a depression could provided in a cast spherical flange similar to the flange 226 shown in FIG. 2 (no depression shown in FIG. 2). In a further alternative embodiment (not shown) a spring-loaded pin is secured to a bracket like the bracket 529 shown in FIG. 5. Thus, to secure the pipe 512, the spring-loaded pin is pulled away from the manifold 514, the exhaust pipe 512 is positioned to the port 511 and the pin (not shown) is released to secure the exhaust pipe to the manifold 514.

While the best modes for carrying out the invention has been described in detail, those skilled in the art in which this invention relates will recognize various alternative designs and embodiments, including those mentioned above, in practicing the invention that has been defined by the following claims.

What is claimed is:

1. An exhaust system for a motor vehicle comprising:
   a manifold having an exhaust port with a first generally spherical mating surface;
   an exhaust pipe having a first end with a second generally spherical, peripheral surface which is sealingly engaged with the first generally spherical mating surface of the exhaust port; and
   a fastener secured to the manifold, the fastener having an axis positioned substantially central with respect to a plane defined by the peripheral surface of the exhaust pipe, the fastener clampingly engaged with an outer surface of the exhaust pipe to clamp the pipe to the manifold.

2. An exhaust system according to claim 1, wherein the fastener is threadably engaged with a bracket secured to the manifold and clamps a surface of the exhaust pipe.

3. An exhaust system according to claim 1, wherein the exhaust pipe further comprises a hole provided therein in alignment with the axis of the fastener, the fastener projects through the exhaust pipe hole and threadably engages the manifold.

4. An exhaust system for a motor vehicle comprising:
   a manifold having an exhaust port with a generally spherical mating surface;
   an exhaust pipe having a first end with a generally spherical peripheral surface which is sealingly engaged with the generally spherical mating surface of the exhaust port, the exhaust pipe having a hole provided therein for passage of a fastener therethrough; and
   a fastener positioned through the hole in the exhaust pipe and engaged with the manifold for clamping the exhaust pipe to the manifold, wherein the fastener clamps the pipe to the manifold substantially central of the exhaust port.

5. An exhaust system according to claim 4, wherein only one fastener is used to secure the exhaust pipe to the manifold.

6. An exhaust system according to claim 5, wherein the hole is sized so as to provide clearance between the fastener and the hole, whereby the exhaust pipe may be adjusted with respect to the manifold.

7. An exhaust system according to claim 4, wherein the first end of the exhaust pipe comprises a flange secured to the exhaust pipe for sealing engagement with the manifold.

8. An exhaust system according to claim 7, wherein the hole is provided in the flange and the fastener passes through the hole and clamps the pipe to the manifold by way of the flange.

9. An exhaust system according to claim 8, wherein the flange and manifold have mating spherical surfaces for sealing engagement therebetween.

10. An exhaust system according to claim 7, further comprising a collar between the flange and manifold.

11. An exhaust system according to claim 4, further comprising a spring provided between the fastener and the exhaust pipe.

12. An exhaust system according to claim 4, further comprising a sealing washer between the fastener and pipe.

13. An exhaust system for a motor vehicle comprising:
   a manifold having an exhaust port with a first sealing surface;
   an exhaust pipe in exhaust communication with the manifold;
   a flange having a first end with a second sealing surface about the periphery thereof which is shaped to conform to the exhaust port sealing surface and which is sealingly engaged with the exhaust port sealing surface, a second end of the flange sealingly engaged with the exhaust pipe, a curved portion provided in the flange between the ends thereof and a hole provided on an outer surface of the flange near the curved portion; and a fastener positioned through the hole in the flange and engaged with the manifold for clamping the exhaust pipe to the manifold, wherein the fastener traverses a plane defined by the exhaust port and flange sealing surfaces, the fastener traversing said plane substantially central of the port to provide substantially even clamp load about the sealing surface.

14. An exhaust system according to claim 13, wherein the sealing surfaces are spherical.

15. An exhaust system according to claim 14, wherein the hole is sized larger than the fastener so as to provide clearance between the fastener and the hole, whereby the exhaust pipe may be adjusted with respect to the manifold.

16. An exhaust system according to claim 15, further comprising a spring provided between the fastener and exhaust pipe.

17. An exhaust system according to claim 16, further comprising a collar provided between the flange and manifold.

18. An exhaust system according to claim 17, further comprising a sealing washer between the fastener and pipe.

* * * * *